United States Patent [19]

Duve

[11] 4,042,853
[45] Aug. 16, 1977

[54] FAIL-OFF PHOTO CONTROL CIRCUIT FOR NIGHT LIGHTING

[75] Inventor: George Duve, Washington, N.J.

[73] Assignee: Area Lighting Research, Inc., Hackettstown, N.J.

[21] Appl. No.: 653,143

[22] Filed: Jan. 28, 1976

[51] Int. Cl.² .......................................... H05B 37/02
[52] U.S. Cl. ................................ 315/155; 250/209; 250/214 AL; 250/578; 315/159; 361/177
[58] Field of Search ............... 315/149, 151, 155, 158, 315/159; 317/124, 127; 250/206 R, 208, 209, 578, 214 AL, 214 C; 240/DIG. 6

[56] References Cited

U.S. PATENT DOCUMENTS

| 1,774,457 | 8/1930 | Singleton | 315/159 X |
| 3,081,417 | 3/1963 | Collier | 250/214 AL |
| 3,835,313 | 9/1974 | Stiefelmeyer et al. | 250/214 C |
| 3,916,183 | 10/1975 | Duve et al. | 317/124 X |

Primary Examiner—Eugene R. LaRoche
Attorney, Agent, or Firm—Kirschstein, Kirschstein, Ottinger & Frank

[57] ABSTRACT

A circuit for controlling the energization of a night lighting load or the like, in which failure of the main circuit to control and shut off electrical supply to the load during daylight hours leads to permanent shutdown of the electrical supply to the load. Two photosensitive elements are provided in the circuit. One element, e.g. a photocell, is a main control which periodically operates a relay and supplies electricity to the load, i.e. at night. The second element, e.g. a second photocell, is connected in the circuit, together with a second relay, in such a manner that failure of the first relay to operate and open the load circuit during daylight hours will cause the second relay to operate and permanently open the load circuit.

9 Claims, 9 Drawing Figures

FAIL-OFF PHOTO CONTROL CIRCUIT FOR NIGHT LIGHTING

BACKGROUND OF THE INVENTION

1. Field of the Invention

The invention relates to control systems for automatically providing electrical power to lighting loads at night and automatically shutting off the power in daytime, by the use of light-sensitive photo cells or the like together with appropriate switches, relays or the like.

2. Description of the Prior Art

One type of prior art photo control system for a lighting load, in general consisted of a photo cell or the like light-sensitive device which operated an on-off switch in accordance with ambient light intensity, so as to provide power to the lighting load at night and to shut off the power supply during daylight hours. Such a system may or may not also use a timing device, such as a clock, for turn-off during the night.

Photo controls used in street lighting applications generally have two basic components, to wit, a photosensitive element such as a photo cell and a relay. A photo cell is a solid state device which typically consists of a semiconductive layer of cadmium sulfide and terminals. The nature of this cell is to have a high ohmic resistance in the dark (during the night), and a low ohmic resistance in the light (during the day). When the resistance is high the relay is closed; conversely, when the resistance is low the relay is open. A photo cell that is electrically energized will age with time, resulting in a gradual increase of its resistance at a given light level. Therefore, the aging of an electrically energized photo cell has the effect of increasing the light level at which the photo control turns off the lighting load. After many years of service a photo cell "sees" no light, causing the relay to remain closed. In this condition, the photo control will keep the street light on continually.

In addition, the relay also can fail, generally in two ways. The first way is by a break in its winding, and the second is by deterioration and eventual final welding shut of its contacts. Both failure modes will cause the light to be energized continually. The percentage of relay failure is generally not as great as that of photo cell failures. In any event, a normal photo control eventually will fail in an on mode by the nature of its construction.

The need for a fail-off photo control, i.e., a light-sensitive control circuit for a night lighting load which, when a component such as the photo cell, per se, or parts of the relay fail to function properly, will permanently shut off the power supply to the load, has arisen because of the energy crisis. Previous to the energy crisis, it was considered desirable to have street-lights or other night lighting loads remain on when photo control failure occurred. With low energy costs, it was justifiable to have the assurance that a street-light would always be lit at night, even though it also would be on all day. As energy costs continue their upward rise, this justification has become less economically sound. A fail-off photo control, i.e., one which would fail in such a manner that would cause a street-light to remain off, will conserve energy which would be wasted during daytime lamp operation. This energy saving is at the expense of having a few street-lights out at night.

SUMMARY OF THE INVENTION

1. Purposes of the Invention

It is an object of the present invention to provide an improved photo control circuit for a night lighting load.

Another object is to provide a photo control circuit for a night lighting load which is a fail-off circuit, i.e., a circuit in which failure or unacceptable deterioration of a component, especially of a main light sensitive photo cell, will result in an open circuit to the load.

An additional object is to provide an efficient, reliable and inexpensive fail-off photo control circuit.

A further object is to provide a photo control circuit for a night lighting load which conserves electrical energy by terminating power supply to the load in the event of failure or unacceptable deterioration of a component of the circuit, such as the main light-sensitive photo cell.

Still another object is to provide a photo control circuit for a night lighting load which upon aging of the main photo cell beyond a predetermined amount turns off the power supply to the load.

Still a further object is to provide a photo control circuit for a night lighting load in which unacceptable deterioration of the main photo cell or failure of the relay terminates power supply to the load.

Still an additional object is to prevent the wasteful consumption of electrical power by lighting loads which, due to unacceptable deterioration or failure of a photo control circuit component, might otherwise continue to consume electrical power during the daytime.

These and other objects and advantages of the present invention will become evident from the description which follows.

BRIEF DESCRIPTION OF THE INVENTION

In the present invention, the control circuit is characterized by the provision of additional components beyond those normally furnished for such circuits, the normally furnished components being, in a preferred embodiment, a main photo cell, a main relay heater winding and a main relay switch having contacts which are closed at night and open in daytime when the control circuit is new. The additional components are so arranged that, if the lighting load, e.g., a street-light, has not been deenergized by the time the ambient light level has reached a first pre-determined intensity, for example, one foot candle when the main photo cell is new, an auxiliary circuit soon will cause a permanent deenergization of the lighting load. This is accomplished by providing an auxiliary photosensitive element such as a photo cell or the like in series with an auxiliary relay heater winding or the like and also in series with the main relay switch contacts or the like which energize the load. The auxiliary photo cell has an associated auxiliary relay which latches in actuated condition. The auxiliary photo cell and its relay are inactive unless the ambient light level has reached a second pre-determined intensity in excess of that required to energize the main photo cell and its switch, e.g., four foot candles. If the main circuit is working properly, by the time the ambient light intensity has reached the second predetermined intensity the main relay switch contacts previously will have opened, and the auxiliary circuit thus will be deenergized and inoperative. However, if a malfunction as described supra occurs, the main relay switch contacts will not have been opened at four foot candles, and the auxiliary photo cell will now operate its relay. The effect of this will be to permanently disengage the load from power supply, in either one of two ways.

A preferred way in which the load is disengaged is for the auxiliary relay, when energized, to open and maintain open auxiliary contacts in series with the lighting load. This permanently deenergizes the load. For example, the auxiliary relay is so constructed that when it is actuated, it will over toggle and permanently stay in an open position, thus permanently deenergizing the load.

An alternative circuit entails the coaction of the auxiliary relay with normally open auxiliary relay contacts or like which are connected to short out the main photo cell, when the auxiliary relay is actuated. This auxiliary relay is so constructed that when it is actuated, it will over toggle and permanently hold its contacts in closed position, thus permanently shorting out the main photo cell and permanently actuating the main relay so as to keep the main switch contacts permanently open.

The control circuits of the present invention possess salient advantages. As mentioned supra, the present circuits will conserve energy which would be wasted during daylight operation, as is the case with failure of prior art circuits. In addition, another benefit of the present fail-off photo control circuits is a reduction in maintenance costs. Since ballast and lamp failures can be detected only at night, and with prior art fail-on photo control, photo control failure only can be detected during the day, it was necessary in prior art systems to have night and day inspection of street-light installations. With the fail-off photo control circuits of the present invention, only night inspection and maintenance is necessary.

The invention accordingly consists in the features of construction, combination of elements and arrangements of parts which will be exemplified in the circuits hereinafter described and of which the scope of application will be indicated in the appended claims.

BRIEF DESCRIPTION OF THE DRAWINGS

In the accompanying drawings in which are shown various possible embodiments of the invention.

DETAILED DESCRIPTION OF THE PREFERRED EMBODIMENTS

Figure 1:
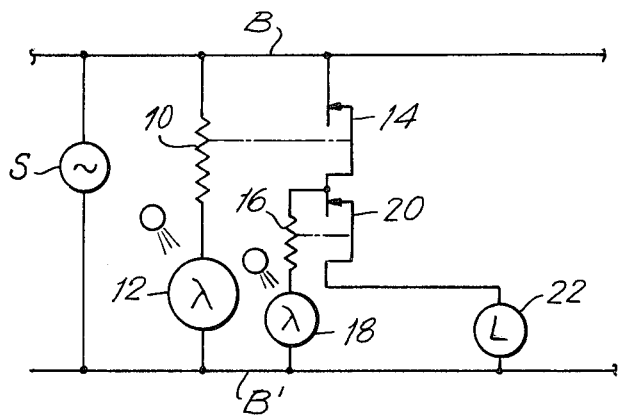
FIG. 1 is a wiring diagram of a preferred fail-off photo control circuit.
Figure 2:
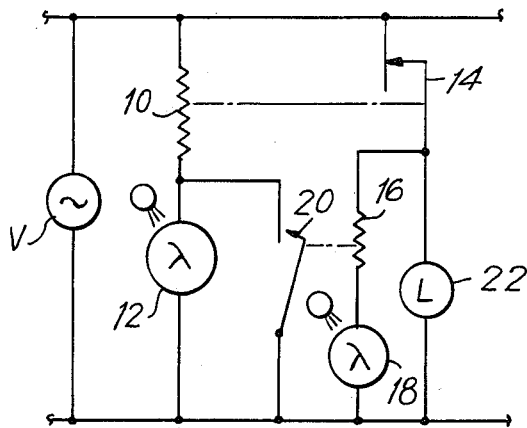
FIG. 2 is a wiring diagram of an alternative fail-off photo control circuit.

As an introduction to the control concepts of FIGS. 1 and 2, it should be noted that photo controls, as used in street lighting application, are sensitive to changes in ambient light level. If the photo cell characteristics changes, the photo control will change the timing of its operation because the photo cell is its only reference. In order to ascertain when the aging of the cell has unduly delayed switching off the street-light at daybreak or to ascertain eventual photo cell failure, or the other failure modes, e.g., heater winding or switch failure, the photo control operation is, pursuant to this invention, compared with a signal from an auxiliary photosensitive element. This auxiliary photosensitive element is so calibrated that its threshold of light intensity required for operation is higher than that of the main photo cell. If the main photo cell circuit fails or is too slow to operate and has not deenergized the lighting load at the light level at which the auxiliary circuit operates, the auxiliary circuit will effect a permanent deenergization of the lighting load.

Referring now to FIG. 1, the nighttime condition of the circuit is shown in the circuit wiring diagram. A voltage source V, which is generally an alternating current power source S of 110 volts or 220 volts A.C., energizes the circuit. The circuit includes a main heater winding 10 connected in series with a main photo cell 12 across busses B, B' that run from the power source. The main heater winding 10 controls main contacts 14 (main switch, i.e., off/on means) that are normally closed at night but are actuated to open condition by the heater winding 10 in the daytime. The main heater winding 10 and its contacts 14 constitute a main relay. The circuit further includes an auxiliary heater winding 16 connected in series first with an auxiliary photo cell 18 and then with the main contacts 14 across the busses B, B'. The auxiliary heater winding 16 controls auxiliary contacts 20 (auxiliary switch, i.e., off/on means) that are normally closed at all times but are actuated to a permanently open condition by the heater winding 16 in daytime if the main contacts 14 do not open previously. The auxiliary heater winding 16 and its contacts 20 constitute an auxiliary relay.

A load, e.g. a street light 22, is connected to the busses B, B' through the auxiliary contacts 20 and the main contacts 14, in series.

As mentioned supra, night conditions are shown in FIG. 1. The main and auxiliary photo cells 12 and 18 have high resistances at night, hence little or no current flows through the main and auxiliary heater windings 10 and 16, hence the main and auxiliary contacts 14 and 20 are closed so that the street-light 22 is energized at night.

Details of a typical main relay are discussed hereinafter. At this point it is noted that the main relay is controlled by the main photo cell. The main relay is idle when the resistance of the main photo cell is high and the current flowing through it accordingly is small. The main relay is operated to open condition when the resistance of the main photo cell is small and the current flowing through it accordingly is high. The switch of the main relay is momentary so that said switch shifts from idle to operated condition when the current flowing through the main photo cell increases sufficiently and said switch automatically reverts to idle condition when the current flowing the main photo cell drops to a sufficiently small value. As later will be seen the operation of the main relay conveniently is accomplished by a bimetallic strip that is in good thermal relationship with the main heater winding so that the strip flexes when the heater winding is energized and resumes its idle condition when the heater winding cools at night and the resistivity of the main photo cell accordingly is high. The moveable tip of the strip engages and operates a normally closed momentary snap main switch when the heater winding is energized at such time as the ambient light is sufficiently intense to substantially reduce the resistivity of the main photo cell and the main photo cell has not yet aged to a degree that it will not turn off the street light early enough during a clear day, e.g. at one foot candle.

Details of a typical auxiliary relay likewise are discussed later. It is like the main relay with two differences. The first is that the switch of the auxiliary relay is not momentary; rather it will remain in the last condition in which it is placed. More specifically the switch is such that, when actuated, it will remain in actuated condition after the motivation, whatever its nature, no longer exists. For example, the switch is of the over toggle type whereby after the motivating force has been removed the switch will stay in actuated condition. The switch also will remain idle if no actuation motivation is provided. The second difference is that the auxiliary photo cell and its relay are less sensitive to ambient light, for operation, than are the main photo cell and its relay, this being true when the photo control circuit and the main photo cell are new and before the main photo cell has so aged or the main photo cell or its relay have failed so that the street lighting is not turned off early enough in the day. The lower sensitivity of the auxiliary photo cell and its relay (or the higher sensitivity of the main photo cell and its relay) to ambient light can be effected in various ways. Thus, the main photo cell simply may have a lower resistance than the auxiliary photo cell at the ambient light intensity at which turn off is desired. Alternatively the resistance of the main heater winding may be lower than that of the auxiliary heater winding so that the main heater winding will heat faster and operate its contacts earlier than the auxiliary heater winding. The same result can be obtained by designing the bimetallic strip heated by the main heater winding to be more rapidly responsive to heating. Still further, the auxiliary relay can be made stiffer than the main relay, hence, slower to be actuated.

It has been found that good results are secured when the main photo cell and its relay are actuated at an ambient light intensity of about one foot candle and the auxiliary photo cell and its relay would be actuated at an ambient light intensity of about four foot candles if the main photo cell and its relay have not previously actuated. The time interval between these two light intensities on a clear day at daybreak and at dusk is approximately seven minutes so that the additional burning time allowed by a photo control of the instant invention is about fourteen minutes each day as compared to burning all day, this being only up to the time that actuation of the auxiliary photo cell and its relay permanently disconnects the lighting load.

A photoelectric tube and amplifier can be used instead of a photo cell as either or both photosensitive elements. Any type of relay can be employed, e.g., thermoelectric/mechanical as mentioned above, or electromechanical, or electronic (a transistor for the main relay and a DC operated SCR for the auxiliary relay). As pointed out supra the main relay must be momentary and the auxiliary relay must latch when actuated so as when once actuated to remain actuated.

In the normal operating cycle of the photo control circuit of FIG. 1, when it is dark the main photo cell 12 has a high resistance and very little current flows through winding 10; therefore, the main contacts 14 are closed. The auxiliary contacts 20 also are closed because auxiliary photo cell 18 does not allow enough current to flow through winding 16 to open the auxiliary contacts 20. With both contacts 14, 20 closed, the load 22 is energized.

As dawn approaches, both photo cells 12, 18 begin to conduct current. The calibration of the main heater winding 10 and the main photo cell 12 are so selected that the main contacts 14 open before the auxiliary contacts 20 can open. Any one or more of the above mentioned options may be employed to secure the desired time differential of operation when the photo control circuit still is new.

When the main contacts 14 open, the lighting load 22 and the auxiliary heater winding 16 as well as the auxiliary photo cell 18 are deenergized. Since the auxiliary heater winding 16 is deenergized, the auxiliary contacts 20 will not open at the higher light intensity level at which they are designed to be actuated. Thus, the auxiliary photo cell 18 is not energized during daylight hours so long as the main photo cell and its relay are in good operating condition.

As dusk approaches, the main photo cell 12 increases in resistance, allowing less current to flow through the main heater winding 10. This causes the main contacts 14 to close since the main relay is momentary and thereupon energize the lighting load. It is now too dark for the auxiliary photo cell 18 to heat the auxiliary heater winding 16 sufficiently to open the auxiliary contacts to deenergize the lighting load.

A normal fail-on photo control would gradually increase the burning time until the lamp load burned all day. An end of life operation of such a normal fail-on photo control would occur suddenly and permanently energize the load.

Any malfunction of the main photo control which does not open the main contacts 14 at all or too long after daybreak, triggers the auxiliary photo control which cuts out the lighting load until the photo control circuit is replaced.

Let is be assumed that the main photo control has been functioning normally but that the main photo cell 12 has drifted to an operating point which now, usually due to aging, causes the main contacts 14 to open just before the auxiliary contacts 20 would open if the auxiliary photo cell were energized if the contacts 14 were closed. If photo cell 12 drifts any further, photo control end-of-life energization of the lighting load will occur. At night time the main contacts 14 are closed due to the slightness of the current flowing through photo cell 12, and therefore also the small current flowing through the main heater winding 10. As dawn approaches, both the main and auxiliary photo cells 12 and 18 will allow current to flow. When the operating point of the main photo cell 12 and its relay has finally drifted past the operating point of the auxiliary photo cell 18 and its relay, e.g., when the resistance of the main photo cell 12 is greater than that of the auxiliary photo cell 18 at a given light level, the auxiliary heater winding 16 will be energized and the auxiliary contacts 20 will open before the main contacts 14. As stated supra, the auxiliary contacts 20 are so constructed that once they are actuated, they will over toggle and permanently stay in an open position, thus permanently deenergizing the lighting load.

The reference for determining the failure of the main photo control is determined by the auxiliary photo cell 18. Any deterioration in response to light intensity of this photo cell 18 will affect the end-of-life light level. The circuit of FIG. 1 is so constructed that the auxiliary photo cell 18 will be energized only half the time (during night only) as compared to the main photo cell 12 which is energized day and night.

Figure 4:
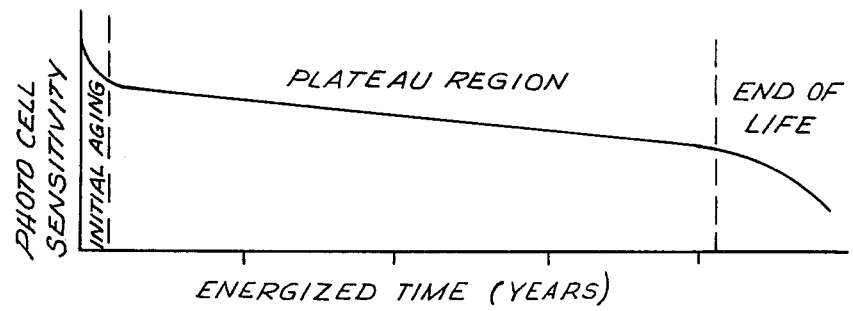
FIG. 4 is a graph of the aging characteristic of a typical photo cell.

The normal aging characteristic of an electrically energized cadmium sulfide photo cell is shown in FIG. 4. From this figure it can be appreciated that when the main photo cell 12 is in the end-of-life region, the auxiliary photo cell 18 is still operating in a plateau region; the auxiliary photo cell 18 will have aged much less than the main photo cell 12, when the main photo cell 12 has come to its end-of-life so that the auxiliary photo cell and its relay can be relied upon to permanently cut out the lighting load.

Operating immediately after a power failure presents a special problem, because if the power returns during the daylight hours, this situation can resemble a failure of the main photo cell 12 due to inadvertent daylight energization of the load 22. During a power failure, the main and auxiliary heater windings 10 and 16 have no current flowing through them, therefore, the main and auxiliary contacts 14 and 20 are closed. As power is suddenly returned, both the main and auxiliary photo cells 12 and 18 will start to conduct electric current. Since the light level can be, and usually is, very high in daytime, both the main and auxiliary heater windings 10 and 16 could operate their respective contacts 14 and 20. Under this condition, the auxiliary contacts 20 should not be operated, because this would cause premature end-of-life for the photo control circuit. In order to prevent the auxiliary contacts 20 from opening under the above conditions, the auxiliary heater winding 16 preferably has a greater electrical resistance than the main heater winding 10. Therefore, when power is suddenly applied to both heater windings, the main winding 10, being of lower resistance will heat much faster than the auxiliary winding 16. In this way, it is assured that the main contacts 14 will open before auxiliary contacts 20 can open, after a sudden application of power.

FIG. 2 shows an alternate circuit in which the auxiliary photosensitive circuit shorts out the main photo cell 12 in the event of failure of the cell 12 to operate properly due to aging and too great an increase in resistance at a given light level. The FIG. 2 circuit is similar to the FIG. 1 circuit and the reference numerals in FIG. 2 refer to the same elements as in FIG. 1. However, the FIG. 2 circuit differs in that the auxiliary contacts 20 are normally open, and when contacts 20 are actuated they over toggle to a permanently closed rather than a permanently open position. The auxiliary contacts 20 in the FIG. 2 circuit are connected in parallel with the main photo cell 12 rather than in series with the load as in FIG. 1. Therefore when the auxiliary contacts 20 of FIG. 2 permanently close the low resistance shunting path, maximum voltage is applied to the main heater winding 10 to keep the main contacts 14 permanently open. The circuit of FIG. 2 does not have the capability of deenergizing the lighting load in the event of failure of the main heater winding 10 or the main contacts 14; however the percentage of relay failures is very small compared to photo cell failures.

Figure 3:
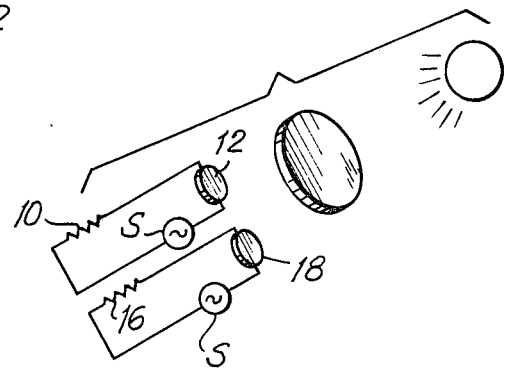
FIG. 3 illustrates a photo cell with preferred appurtenances.

FIG. 3 illustrates a modified form of the invention in which provision is made to lengthen photo cell life. This consists in placing a special filter 24 over the photo cells 12 and 18. This filter is characterized and constructed so that it increases its light transmission at a rate relative to time which acts to at least partially offset the loss of sensitivity of the photo cell. This may be accomplished by incorporating in the filter a dyestuff which is slowly reduced to a leuco or near leuco state by sunlight. The photo cell control is modified, as by proportionately decreasing the resistance of the heater windings to compensate for the decrease in sensitivity caused by lowering of the light intensity impinging on the photo cells. The aging of photo cells is slowed down by lowering the intensity of impinging light.

Figure 5A:
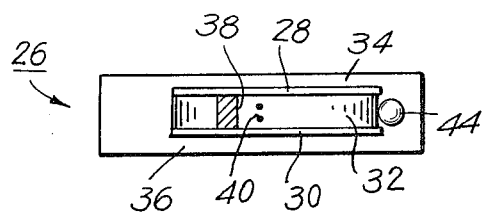
FIGS. 5A and 5B are, respectively, plan and side views of a standard main relay momentary snap switch used in the photo control circuit of FIGS. 1 and 2, with the switch in its closed position.
Figure 5B:
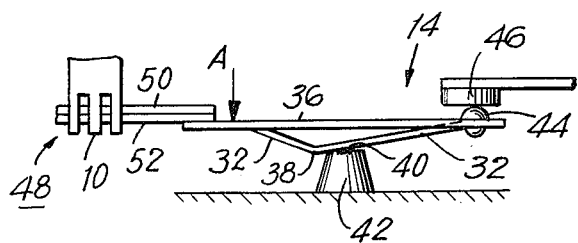
Figure 6:
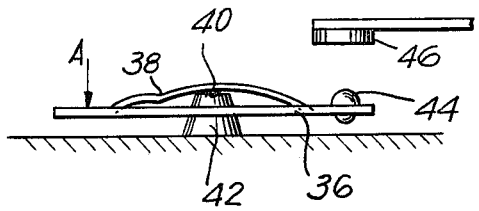
FIG. 6 shows the switch of FIGS. 5A and 5B in its open position.

FIGS. 5A and 5B show in closed position position the main contacts 14 of a momentary normally open thermoelectric/mechanical snap switch of conventional construction. The switch includes a rectangular sheet spring 26 of thin beryllium copper. The spring 26 has two parallel coextensive linear slots 28 and 30 parallel to the longitudinal axis of the spring 26 and terminating short of the narrow ends thereof, so that the spring 26 is divided into a center leg 32 in one piece with two outer legs 34 and 36. The spring 26 is swaged to the idle configuration shown at 38 in FIG. 5B, so as to cause a compressive stress in the center leg 32 and tensile stresses in the outer legs 34 and 36. The spring 26 is mounted as by welding 40 atop a fixed post 42. As can best be seen in FIG. 5B, in idle configuration the center leg 32 extends downwardly from the plane of the outer legs 34 and 36 and is subdivided into two linear portions sloping downwards at different angles to the swage 38. The spring 26 is provided with a movable end contact button 44 which in idle configuration of the spring engages an opposed stationary contact button 46. When a force is applied at an end of the spring 26, e.g. by the tip of a bimetallic strip 48 heated by the main heater winding 10, which results in the strip 48 flexing downwardly at its free end due to differential expansion of the upper metal layer 50 and the lower metal layer 52, the associated ends of the outer legs 34 and 36 will be depressed. Upon these ends of the outer legs 34 and 36 being deflected below the swage 38, the spring 26 will snap down and the contact buttons 44 and 46 will separate as the previously linear portions of the center leg assume the positions shown in FIG. 6.

When the force A is removed, as for example due to a cessation of electric current flow through the main heater winding 10 so that the bimetallic strip 48 cools and returns to its idle position shown in FIG. 5B, the center leg 32 will resume its idle position and in so doing will snap the outer legs 34 and 36 above the swage 38. Thus, the spring 26 will snap back to its original closed condition of FIG. 5B.

Figure 7:
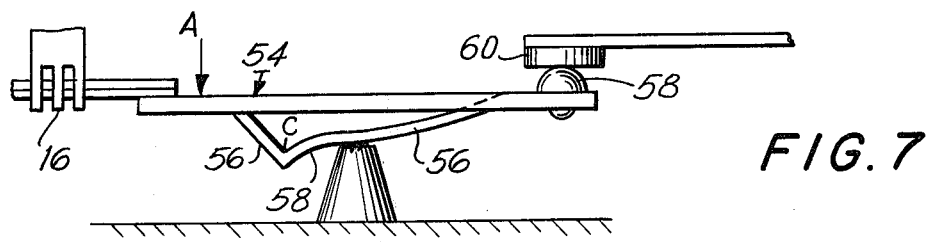
FIG. 7 shows a typical snap latch-when-actuated switch used in the circuit of FIG. 1; the switch is shown in its closed position.
Figure 8:
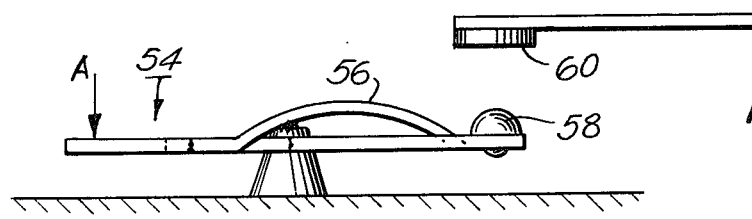
FIG. 8 shows the switch of FIG. 7 in its permanently open position.

FIGS. 7 and 8 show the idle and actuated conditions, respectively, of the auxiliary contacts 20 that in association with the auxiliary heater winding 16 constitutes the auxiliary relay of the lock-out section of the photo control circuit of FIG. 1. This switch is a thermoelectric/mechanical latched-when-actuated snap switch of conventional construction that latches in actuated condition and most accurately is termed a latched-when-actuated snap switch. The spring 54 of this latched-when-actuated switch is similar to the spring 26 of the momentary snap switch of FIGS. 5 and 6, except that the center leg 56 is formed to the idle position shown in FIG. 7. The swage C is permanent as is the bend 58 in the longer portion of the center leg. When a force A is applied, as by a bimetallic strip flexing upon application of heat generated by the auxiliary heater winding 16, the spring 54 will snap to the actuated position shown in FIG. 8 in which a movable contact button 58 on the spring separates from a fixed contact button 60. These buttons are in engagement (see FIG. 7) when the switch is in idle (not-actuated) condition. Unlike the spring 26, the spring 56 will remain in actuated (contact-open) position. When the force A is removed, as by cooling of the heater winding 10 in the daytime when the main photo cell, although aged beyond the point of usefulness, passes sufficient current to open the main contacts 14 too long after daybreak, the buttons 58, 60 stay separated. The strip 56 only can be restored to idle position by applying a force opposite to the force A; however this is not an intended mode of use.

It thus will be seen that there are provided fail-off photo controls which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. A light-sensitive fail-off control circuit for a night lighting load, said circuit comprising
  A. a source of electric energy;
  B. a main photo sensitive element for varying flow of electrical current in response to change in ambient light intensity;
  C. a main electrically motivated actuation means;
  D. a main momentary off/on means responsive to said main electrically motivated actuation means for controlling electrical current flow;
  E. said main photosensitive element and said main actuation means being connected in series across said source of electric energy;
  F. said main actuation means actuating said main off/on means at a first ambient light intensity when said main photosensitive means is new;
  G. an auxiliary photosensitive element for varying flow of electric current in response to change in ambient light intensity;
  H. an auxiliary electrically motivated actuation means;
  I. an auxiliary off/on latched-when-actuated means responsive to said auxiliary electrically motivated actuation means for controlling electrical current flow;
  J. said auxiliary photosensitive element and said auxiliary actuation means deriving power in series from said source of electrical energy when said main off/on means is closed;
  K. said auxiliary actuation means actuating said auxiliary latched-when-actuated means at a second ambient light intensity somewhat in excess of the first ambient light intensity;
  L. said night lighting load and said off/on means being series connected in circuit across said source of electric energy whereby during normal nighttime operation of the circuit said load is energized and during normal daytime operation of the circuit the load is deenergized; and
  M. circuit means to connect said auxiliary latched-when-actuated means to permanently interrupt the load energizing circuit when the light intensity required to energize the main photosensitive element sufficient to close the main off/on means exceeds the second light intensity after long aging of the main photosensitive element.

2. The circuit of claim 1, in which said main photosensitive element and said auxiliary photosensitive element are photo cells.

3. The circuit of claim 2, in which each of said main and said auxiliary actuation means comprises a heater winding and a bimetallic strip.

4. The circuit of claim 3, in which the heater winding of said main actuation means has a lower resistance than the heater winding of said auxiliary actuation means, whereby impression of the same voltage potential across both heater windings causes the primary actuation means heater winding to heat more rapidly than the auxiliary actuation means heater winding.

5. The circuit of claim 2, in which a filter is provided between each photo cell and ambient light, said filter increasing its light transmission over a span of time whereby said filter at least partially offsets for loss of sensitivity of the photo cells due to aging.

6. The circuit of claim 1, in which the first light intensity is about 1 foot candle and the second light intensity is about 4 foot candles.

7. The circuit of claim 1 in which said auxiliary photosensitive element and said auxiliary actuation means are in series with said main momentary off/on means across said source of electric energy, and in which said load and said auxiliary off/on latched-when-actuated means is in series with said main momentary off/on means across said source of electric energy and in parallel with said series connected auxiliary photosensitive element and said auxiliary actuation means, said auxiliary off/on latched-when-actuated means being normally closed and open when actuated.

8. The circuit of claim 1 in which said auxiliary photosensitive element and said auxiliary actuation means are in series with said main momentary off/on means across said source of electric energy, in which said load is directly connected in series with said main off/on momentary means across the source of electric energy, and in which said auxiliary off/on latched-when-actuated means is normally open and is closed when actuated and is connected across said main photosensitive element.

9. A light-sensitive fail-off control circuit for a night lighting load, said circuit comprising
  A. a source of electric energy;
  B. a main photosensitive element having an electrical characteristic that varies across a first threshold of light intensity as a function of the intensity of ambient light;
  C. an auxiliary photosensitive element having an electrical characteristic that varies across a second threshold of light intensity as a function of the intensity of ambient light;
  D. said first threshold being lower than said second threshold when said main photosensitive element is new;
  E. means controlled by said main photosensitive element to connect the load to the source of electric energy at an ambient light intensity below said first threshold and to disconnect the load from the source of electric energy when the ambient light intensity exceeds said first threshold; and
  F. means controlled by said auxiliary photosensitive element to permanently disconnect the load from the source of energy when the ambient light intensity exceeds said second threshold of light intensity if not previously disconnected according to (E);
  G. said main photosensitive element having a characteristic such that said first threshold increases as the main photosensitive element ages and eventually exceeds said second threshold.

* * * * *